United States Patent
Fletcher et al.

[15] 3,700,005
[45] Oct. 24, 1972

[54] GAS FLOW CONTROL DEVICE

[72] Inventors: James C. Fletcher, Administrator of the National Aeronautics and Space Administration with respect to an invention of; John B. Wellman, 2121 Valderas Drive #90, Glendale, Calif. 91208

[22] Filed: Aug. 10, 1971

[21] Appl. No.: 170,440

[52] U.S. Cl. ............... 137/608, 137/81.5, 251/122, 138/45
[51] Int. Cl. ........................... F17d 1/10, F17d 1/00
[58] Field of Search ............... 137/608, 81.5; 138/45; 251/122

[56] References Cited

UNITED STATES PATENTS

| | | |
|---|---|---|
| 2,240,119 | 4/1941 | Montgomery et al....138/45 X |
| 2,345,840 | 4/1944 | Strong.....................138/45 X |
| 3,102,552 | 9/1963 | Biegel et al. ...........251/122 X |
| 3,317,184 | 5/1967 | Usry.........................251/122 |
| 3,458,170 | 7/1969 | Vogeli.......................251/122 |
| 3,472,255 | 10/1969 | Fox et al.................137/81.5 |
| 3,502,308 | 3/1970 | Simizu.....................138/45 X |
| 3,645,293 | 2/1972 | Pedersen..................137/608 |

*Primary Examiner*—Samuel Scott
*Attorney*—Monte F. Mott et al.

[57] ABSTRACT

A gas flow control device is disclosed comprising a housing with an input port through which gas enters the housing. At the input port the subsonic gas flow is converted into supersonic flow. The housing includes a movable probe with a conical external surface which produces a shockwave when impinged by the supersonic gas flow. The probe has a cavity with a shape of a truncated cone with the top of the cone serving as the cavity input. Mounted in the housing and surrounded by the probe is a mandrel with a truncated cone-shaped top, whose surface corresponds to the cavity surface. By moving the probe toward and away from the input port, the rate of gas flowing to an output port is controlled. The shockwave prevents disturbances due to changes in the gas flow rate from advancing upstream.

8 Claims, 2 Drawing Figures

JOHN B. WELLMAN
*INVENTOR.*

BY Monte F. Mott
Wilfred Grifka
ATTORNEYS

GAS FLOW CONTROL DEVICE

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention is directed to a gas flow control device and, more particularly, to a device for selecting a portion of gas from a gas jet stream.

2. Description of the Prior Art

There are many applications in which it is necessary to extract a portion of gas in a stream for analysis purposes. In some such applications it is necessary to insure that changes in the extracted gas portions downstream does not effect test instruments upstream. For example, in a gas analysis system consisting of a gas chromatograph (GC) and a mass spectrometer (MS), constituents of a gas sample are segregated by the GC. Each constituent in turn is eluted, passes through an interface then into the MS for further analysis. If the rate of mass flow of any constituent is too great, it will overload the MS. It is therefore necessary to provide some means for selectively reducing the flow of gas of certain sample constituents which are introduced to the MS. However, such gas flow reduction must be accomplished without producing disturbances in the gas flow which are transmitted upstream, back into the GC. Otherwise, the gas flow rate is affected, thereby invalidating the data, recorded by the GC detector.

Herebefore, when such gas flow regulation has been required, it has been necessary for an operator to bleed away excess gas flow by opening and closing appropriate valves. Such a control technique produces undesired disturbances in the gas flow which are transmitted upstream. Thus a need exists for a new device for controlling the flow rate of gas in a stream without producing flow disturbances which are transmitted upstream.

OBJECTS AND SUMMARY OF THE INVENTION

A primary object of the present invention is to provide a new improved gas flow control device.

Another object of the present invention is to provide a new improved device for controlling the rate of gas flow from a gas stream to an analyzing instrument.

A further object of the present invention is to provide a device for controlling the percentage of gas in a gas stream which is directed to an analyzing instrument without producing disturbances upstream.

These and other objects of the invention are achieved by providing a housing with an input port. The port is designed so that a subsonic gas jet stream is converted into a supersonic stream as it enters the housing. Facing the input port in the housing is a movable probe which is cylindrical in shape except for the end facing the input port. The exterior of this probe end is in the shape of a truncated cone. The conical surface creates a shockwave of the supersonic jet stream which strikes it.

The probe defines a longitudinal cavity extending from one end of the probe to the other. The cavity extends from the top of the end facing the input port in the form of a truncated cone, and thereafter tapers off to form a cylindrical cavity. A gas seal surrounds the probe to prevent gas from passing around the probe to an output port, limiting gas flow to the output port only through the probe cavity.

A mandrel is fixedly supported in the housing and it extends into the probe cavity. The mandrel has one end directed to the input port in the shape of a truncated cone which corresponds to the shape of the truncated cone portion of the probe cavity. The housing also defines an exit port for gas in the housing which does not pass through the probe cavity. By controlling the position of the probe the rate of gas flow to the output port is controlled. The shockwave prevents any disturbances from passing to the input port and therefrom to any instruments upstream.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
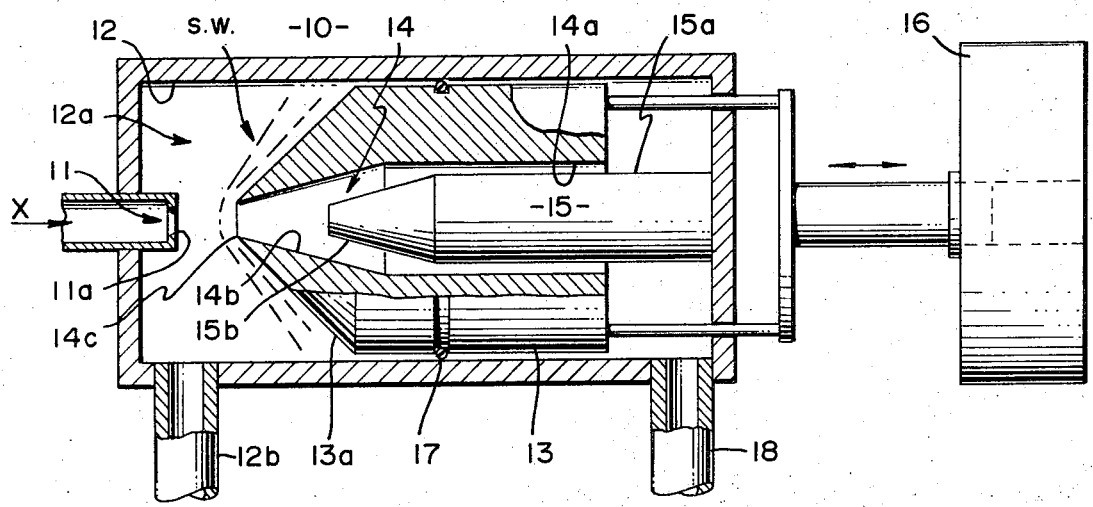
FIGS. 1 and 2 are cross-sectional views of the novel device of the present invention.

In FIG. 1, the device of the present invention, which is designated by numeral 10, is shown comprising a hollow housing 12. A subsonic gas jet stream, represented by arrow X, is assumed to flow from an upstream instrument. It enters the housing through an input port 11. This port is designed to convert the gas flow to a supersonic flow. In FIG. 1, the port 11 is shown with knife edges 11a. These knife edges cause a supercritical pressure drop at nominal gas flow rate, thereby converting the incoming gas to supersonic flow.

A chamber 12a in the housing contains the flow of the free jet, leaving the input port. This chamber, which is provided with an exit port 12b, is formed by the interior surface of the housing and the exterior of a probe 13. The probe, which is movable, is shown as a cylinder capped by a truncated cone with an outer conical surface 13a. The cone defines a longitudinal cavity 14 which has a cylindrical portion 14a, capped by a truncated cone portion 14b. The top 14c of the cavity portion 14b extends to and defines the top of the truncated cone surface 13a. The input port 11 is aligned with the longitudinal axis of the probe 13. The supersonic gas flow when encountering surface 13a, produces a shockwave as represented by dashed lines S.W.

Fixedly connected to the housing 12 is a mandrel 15, which is shown consisting of a solid cylinder portion 15a capped by a truncated cone portion 15b. The geometric shape of the cone portion 15b is identical to that of the truncated cone portion 14b of the cavity 14. The mandrel 15 is supported so that its longitudinal axis coincides with the probe's longitudinal axis. Part or all of the mandrel is in cavity 14, depending on the position of the probe 13. As seen from FIG. 1, the diameter of mandrel cylindrical portion 15a is less than that of the cylindrical cavity portion 14a. The position of the probe in the housing is controlled by an external positioning mechanism 16.

Figure 2:
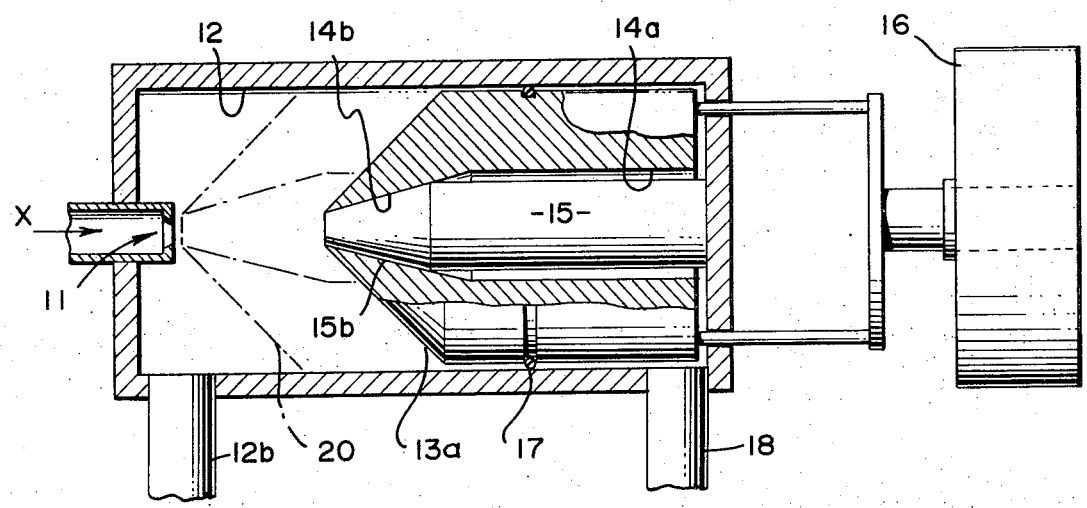

Surrounding the probe 13 is a seal 17 which prevents seepage of gas around the probe to the device's output port 18. The rate of gas flow between the input and output ports depends on the probe's position. When the probe 13 is positioned as shown in FIG. 2, so that the mandrel's conical surface 15b abuts the conical surface 14b, the cavity 14 is closed. Consequently gas entering the housing, does not reach the output port 18. All the gas exits through exit port 12b. On the other hand, when the probe is positioned, as shown in FIG. 2 by dashed lines 20, the top 14c of the cavity in surface 13a is adjacent the input port 11, and since the cavity is now open, substantially all the gas enters cavity 14 and therefrom flows in the space between the mandrel and the probe to the output port 18. In this position very little, if any, gas exits through exit port 12b. Any selected rate of flow, or alternately stated any selected percentage of the gas flow, may be directed to the output port by controlling the probe position by positioning mechanism 16.

From the foregoing it is thus seen that in the present device the fraction or percentage of gas extracted is determined by the movement of a single element, ie., the probe 13. This contrasts with the prior art in which it is necessary to control two valves, one controlling the output port and the other controlling the exit port. Furthermore, in the present invention any disturbances downstream from the device travelling and entering port 18 cannot pass through the shockwave. Thus, the device prevents disturbances downstream for affecting upstream instruments. This is particularly important if the upstream instrument is a gas chromatograph which may include detectors sensitive to pressure and flow rates. Added advantages of the device of the present invention is its small dead volume, low power requirement for probe positioning and a short time constant.

Although particular embodiments of the invention have been described and illustrated herein, it is recognized that modifications and variations may readily occur to those skilled in the art and consequently it is intended that the claims be interpreted to cover such modifications and equivalents.

What is claimed is:
1. A gas flow control device comprising:
a housing, having a hollow interior and defining an input port through which gas may enter into said housing at a first housing end, an output port at substantially a second housing end, opposite said first end, and an exit port;
mandrel means fixedly supported in said housing and having an exposed end of a preselected shape pointing toward said input port;
a probe defining a cavity port which has a surface, corresponding to the preselected shape of the outer surface of said mandrel means, and an outer surface exposed to the gas entering said housing through said input port for forming a shockwave of the gas entering said housing; and
means for supporting said probe about said mandrel means and moving said probe toward and away from said mandrel to control the percentage of gas entering said housing which passes to said output port through the space between the inner surface of the probe cavity and the outer surface of said mandrel means.

2. The arrangement as recited in claim 1 wherein said housing at the input port includes an edge surface with a configuration to convert subsonic gas flow to supersonic flow entering said housing.

3. The arrangement as recited in claim 1 wherein the exposed end of said mandrel means is in the shape of a truncated cone and the shape of the cavity port surface is a truncated cone, whereby gas enters said cavity through the truncated top of said cone.

4. The arrangement as recited in claim 3 wherein said housing at the input port includes an edge surface with a configuration to convert subsonic gas flow to supersonic flow entering said housing.

5. A fluid flow control device comprising:
a housing having a hollow interior and defining an input port through which fluid enters said housing said port being aligned with a longitudinal axis of said housing and at a first end thereof;
elongated mandrel means in said housing along said longitudinal axis with a first end of said mandrel means fixedly connected to a second end of said housing, opposite said housing first end, and extending to a mandrel means second end pointing toward said input port, said mandrel means second end being in the shape of a truncated cone;
a probe in said housing, the probe defining a longitudinal cavity extending from a first probe end through which said mandrel means extends into said cavity to a second probe end which is directed toward said input port and which has a conical surface to form a shockwave of the gas entering said housing, the cavity of said probe near its second end having a conical surface corresponding to the conical surface of the truncated cone of said mandrel means;
seal means between said probe and the interior surface of said housing for inhibiting gas flow in the space between said housing and said probe, said seal means dividing said housing into first and second separate chambers and said housing further defining first and second output ports in said first and second chambers respectively; and
means for controlling the relative position of said probe to control the spacing between the conical surfaces of said mandrel means and said cavity, and thereby control the division of the gas which exits through said first and second output ports.

6. The arrangement as recited in claim 5 wherein the opening of said cavity at the second end of said probe has a configuration corresponding to the top of the truncated cone of said mandrel means, whereby when said probe is at a position in which the conical surface of the mandrel means abuts the conical surface of said cavity the top of the mandrel means closes the opening of the cavity at the second end of said probe.

7. The arrangement as recited in claim 5 wherein said housing at the input port includes an edge surface with a configuration to convert subsonic gas flow to supersonic flow entering said housing.

8. The arrangement as recited in claim 7 wherein the opening of said cavity at the second end of said probe has a configuration corresponding to the top of the truncated cone of said mandrel means, whereby when said probe is at a position in which the conical surface of the mandrel means abuts the conical surface of said cavity the top of the mandrel means closes the opening of the cavity at the second end of said probe.

* * * * *